(12) United States Patent
Eason et al.

(10) Patent No.: US 6,283,421 B1
(45) Date of Patent: Sep. 4, 2001

(54) INSTRUMENT SUPPORT SYSTEM

(75) Inventors: Donald H. Eason; Robin R. Slaton, both of Fort Collins; Douglas A. Kempel, Wellington, all of CO (US)

(73) Assignee: Ultimate Support Systems, Inc., Fort Collins, CO (US)

( * ) Notice: Subject to any disclaimer, the term of this patent is extended or adjusted under 35 U.S.C. 154(b) by 0 days.

(21) Appl. No.: 09/393,081

(22) Filed: Sep. 9, 1999

(51) Int. Cl.[7] .................. F16M 11/34; F16M 11/38; G10G 5/00

(52) U.S. Cl. ............... 248/170; 248/173; 248/188.6; 248/188.7; 84/327

(58) Field of Search ................. 248/170, 166, 248/168, 173, 528, 188.6, 188.7, 125.1, 125.3, 126; 211/203; 84/327, 421; 403/99, 27

(56) References Cited

U.S. PATENT DOCUMENTS

| | | | |
|---|---|---|---|
| 230,851 | 8/1880 | Anthony | 126/333 |
| D. 332,882 | 2/1993 | Graves | D6/466 |
| 368,426 | 8/1887 | Ruttmann et al. | 256/26 |
| D. 435,365 | * 12/2000 | Eason et al. | D6/466 |
| 730,062 | 6/1903 | Widmer | 248/170 |
| 1,673,205 | 6/1928 | Romao | 211/85.6 |
| 1,684,912 | 9/1928 | Dunklau | 211/85.6 |
| 1,863,756 | 6/1932 | Lufkin | 248/170 |
| 2,630,289 | * 3/1953 | Selig | 248/169 |
| 2,727,708 | 12/1955 | Lorenzen | 248/520 |
| 2,940,709 | * 6/1960 | Neuwirth | 248/168 |
| 3,526,380 | 9/1970 | Tong | 248/528 |
| 3,709,454 | 1/1973 | Hyde | 248/351 |
| 3,804,355 | 4/1974 | Uroshevich | 248/125 |
| 3,881,675 | 5/1975 | Matchett | 248/170 |
| 3,958,786 | 5/1976 | Mann | 248/176 |
| 4,010,922 | 3/1977 | Heller et al. | 248/165 |
| 4,061,302 | 12/1977 | Boone | 248/170 |
| 4,317,552 | * 3/1982 | Weidler | 248/168 |

(List continued on next page.)

OTHER PUBLICATIONS

Hamilton Stands, Inc., "Guitar Stands", web page brochure, http://www.hamiltonstands.com/Guitar_Stands.htm, down loaded May 13, 1999, two pages.

Monteleone Instruments, "When Your Loved One Can't Be Cradled In Your Own Arms . . .", web page brochure, http://www.guitarvings.com/,down loaded May 14, 1999, two pages.

König & Meyer (K&M)—Stands for Music, "175—Guitar Stand", web page brochure, http://www.k–m.de/km_scripts/e_liste_artikel.idc?AK_ID=135, down loaded May 14, 1999, one page.

König & Meyer (K&M)—Stands for Music, "175/1—Guitar Stand", web page brochure, http://www.k–m.de/km_scripts/e_liste_artikel.idc?AK_ID=135, down loaded May 14, 1999, one page.

König & Meyer (K&M)—Stands for Music, "176/1—Guitar Stand", web page brochure, http://www.k–m.de/km_scripts/e_liste_artikel.idc?AK_ID=135, down loaded May 14, 1999, one page.

(List continued on next page.)

Primary Examiner—Ramon O. Ramirez
Assistant Examiner—Jon Szumny
(74) Attorney, Agent, or Firm—Santangelo Law Offices, P.C.

(57) ABSTRACT

An instrument support system having positive locking mechanisms to substantially fix the position of articulated members. One embodiment of the invention uses radially opposed force receiving surfaces to lock pivot members and to distribute the inherent and operational forces transmitted to the radially opposed force receiving surfaces to multiple vectors. Another embodiment of the invention juxtaposes antagonist locking surfaces to hold dual position support members in a storage position. A restraining collar is also disclosed having operation position and storage position locking detents and a releasably coupled collar closure.

74 Claims, 14 Drawing Sheets

U.S. PATENT DOCUMENTS

| | | | |
|---|---|---|---|
| 4,352,480 | 10/1982 | Garthright | 248/443 |
| 4,467,693 | 8/1984 | Nasfell, Jr. | 84/329 |
| 4,671,479 | 6/1987 | Johnson et al. | 248/173 |
| 4,691,610 | 9/1987 | Gilbert | 84/327 |
| 4,693,161 | 9/1987 | Uhrig | 84/327 |
| 4,695,021 | 9/1987 | Leinfelder | 248/168 |
| 4,744,536 * | 5/1988 | Bancalari | 248/166 |
| 4,785,708 | 11/1988 | Vaughan | 84/329 |
| 4,807,837 | 2/1989 | Gawlik et al. | 248/125 |
| 4,890,531 | 1/1990 | Tischer | 84/329 |
| 4,923,156 | 5/1990 | Linneusson | 248/170 |
| 5,029,795 * | 7/1991 | Dexter | 248/431 |
| 5,213,296 | 5/1993 | Lee | 248/166 |
| 5,340,066 | 8/1994 | Ditch | 248/170 |
| 5,375,497 | 12/1994 | Pirchio et al. | 84/327 |
| 5,454,473 | 10/1995 | Hennessey | 211/13 |
| 5,505,413 | 4/1996 | Hennessey | 248/166 |
| 5,664,756 | 9/1997 | Liao | 248/443 |
| 5,713,547 | 2/1998 | Yu | 248/166 |
| 5,725,106 * | 3/1998 | Wilson | 211/13.1 |
| 5,744,735 | 4/1998 | Liao | 84/327 |
| 5,823,491 * | 10/1998 | Lindsay et al. | 248/188.6 |
| 6,005,176 * | 12/1999 | Yu | 84/327 |
| 6,007,032 * | 12/1999 | Kuo | 248/188.7 |

OTHER PUBLICATIONS

König & Meyer (K&M—Stands for Music, "17660—Guitar Stand", web page brochure, http://www.k–m.de/km_scripts/e_liste_artikel.idc?AK_ID=135, down loaded May 14, 1999, one page.

Quik–Lok, "Quik–Lok—Stands Apart From the Rest" http://quiklok.com/search_list.taf?_function=detail&Layout_0_uid1=33047, down loaded May 14, 1999, one page.

* cited by examiner

INSTRUMENT SUPPORT SYSTEM

BACKGROUND OF THE INVENTION

Generally, this invention relates to both apparatus and methods for an instrument support system for placement and positioning of various types of instruments, equipment, gear, machinery, paraphernalia, tackle, utensils, tools and the like. Specifically, this invention discloses devices to secure the position of the articulated components of an instrument support system during operation or during storage. Also disclosed is an instrument restraining collar adapted to hold a variety of instruments and accessories.

Instrument support systems having collapsible designs are well known for the placement and positioning of an almost limitless variety of items such as collapsible enclosures, cameras, chairs, musical instruments, microphones, clothing, sun lamps, liquid medications, and Christmas trees, to name a few. With regard to most collapsible supports, the collapsible support members have a limited range of travel about articulated couplings. Within the range of travel, articulated support members may be secured at desired positions for operation or for storage of the support system by some form of locking mechanism. Because there is a large commercial market for support systems, the manner of securing or locking the position of the articulated support members at a desired position has taken a variety of forms. In spite of the variety of supports available to the consumer, substantial problems remain unresolved with respect to providing a collapsible support having devices to secure the position of the articulated support members.

A significant problem which those in the field of instrument support systems face with regard to securing the position of articulated members is the wear and tear on the mechanisms and specifically the wear on the opposing surfaces which engage to substantially secure the articulated member(s) in a desired position. In many instances, the wear and tear on these mechanisms and surfaces is exacerbated by support system designs which translate relatively small discrete inherent and operational forces of the support system into a larger combined force which may be subsequently applied to a relatively small opposing force receiving surface area. As a result, the force receiving mechanisms and surfaces are prone to increased wear and failure rates. An example of this problem is shown in U.S. Pat. No. 4,671,479 where the inherent and operational forces of the support device are translated from the leg members to the inner ends of each leg member which is formed like a blade. All the blades rotate and engage upon a single opposed locking ring surface. As such, the locking ring bears a substantially non-vectorial axial force which is nearly equal to the sum of all the inherent and operational forces of the support device. A support with a similar force concentrating design is disclosed by U.S. Pat. No. 3,804,355.

Another problem with respect to securing the position of an articulated member is providing opposed engagement surfaces which cannot become disengaged during operation, or storage of the support system. Some support systems employ the use of co-axial components which slide into place to oppose the travel of the articulated member. Because such co-axial components are free to move, such components may move and become inadvertently disengaged with the articulated support resulting in failure of the support. Moreover, co-axial components as disclosed may not be suitable for supports which are inverted or moved from a vertical operating position. Examples of this type of co-axial component are disclosed by U.S. Pat. Nos. 730,062; 3,709,454; and 4,923,156.

Another problem that is frequently encountered in support technology are articulated members which are substantially prevented from further travel in a particular direction by engagement with another fixed opposing surface yet are free to rotate in the reverse or alternate directions. Typically, this is the case when the operational and inherent forces are used to push the articulated member against the opposing engagement surface but the opposing engagement surface does not positively lock the member in that position. As is disclosed in U.S. Pat. Nos. 3,526,380; 5,454,473; and 4,010,922, when the instrument support is in operation the articulated members are moved into engagement with a fixed surface by the weight of the instrument acting upon the articulated member. When the weight of the instrument is removed, by picking the support up for example, the articulated members may travel freely away from the opposing engagement surface. This free travel away from the opposing engagement surface may make the support less stable and more difficult to set up, use and store. An attempt to alleviate this problem is disclosed in U.S. Pat. No. 5,340,066 which uses a cam at the end of the support member to frictionally engage a fixed surface. This approach, however, does not positively lock the articulated member and may not prevent the articulated member from becoming disengaged from the friction surface. Similarly, at least one design maintains continuous pressure on tie articulated support members but does not lock them in the desired position as disclosed by U.S. Pat. No. 2,727,708.

Yet another problem with previous instrument support systems is the potential for damage to articles and injury to users that inadvertently become caught between the surface of the articulated member and the opposing fixed surfaces upon which they engage. As can be understood from U.S. Pat. Nos. 4,010,922; 4,923,156; and 730,062 the user or other items can be caught between the upper end of the articulated member as it rotates about a pivot to engage a fixed base plate, thimble, or locking element. Similarly, as can be understood from U.S. Pat. Nos. 5,340,066; 5,454,473 the user or other items can be caught between the articulated member below the pivot point where the articulated member engages a base member or a hub piece. Alternately, as can be understood from U.S. Pat. No. 3,526,380 the user and other items can be caught in the shear created between the abutment planes and the bifurcated ends of the legs as they close.

Another problem with prior designs is that the articulated support members may simply come apart from the instrument support. As can be understood from U.S. Pat. No. 230,851, the arms may simply come out of the standard head during use and may fall upon the user or cause other damage. Similarly, as can be understood from U.S. Pat. No. 4,010, 922 the legs may come loose if the support brace is deformed.

Still another problem with prior designs is the complexity of the design and operation. In some prior designs a spring is required in each leg to either urge the leg into engagement with the fixed engagement surface or locking mechanism. This spring is generally accompanied by an assortment of coupling hardware. If the spring breaks or becomes disengaged from the hardware the support system fails. In addition, the user must manipulate each articulated member in a separate step of pulling each member to overcome the force of the spring to operate or adjust the support system. As disclosed in U.S. Pat. Nos. 4,744,536; 1,863,756, and 5,213,296 these numerous components and additional steps of operation may lead to failure of the instrument support and additional maintenance costs.

With regard to instrument support systems which include a yoke, a restraining collar or other features specialized to interface with other equipment, such as guitars as one example, many of the above mentioned problems apply. In many restraining collar designs the range of motion of articulated members is limited by engagement with another fixed surface but is not positively locked in that position. Examples of restraining collars which do not positively lock are disclosed by U.S. Pat. No. 4,691,610 and sales brochures from Hamilton Stands, Inc. (product number KB38), which show yokes which pivotally rotate to a fixed operational position but do not positively lock. A guitar is supported by hanging the guitar within the yoke by the guitar neck. On lifting the guitar from the yoke, the guitar may become jammed within the yoke because the yoke may rotate and stay engaged with the guitar. Another problem with previous restraining collar design include the lack of a storage position feature as disclosed by brochures from Konig & Meyer (model 175, 176, and 17660); and brochures from Monteleone Instruments (The Grand Stand). Still another problem with prior restraining collar designs is that they lack any manner of collar close to keep an instrument from falling out of the restraining collar. Yet another problem with previous restraining collar designs is that they do not integrate any manner of instrument peripherals holder for easily misplaced or lost items such as guitar picks, cords, lead ends, and the like.

A similar problem exists with regard to instrument support systems which include instrument support members. Existing instrument support members do not have positive locking designs as can be understood from U.S. Pat. No. 5,454,473 and the sales brochures from Quik Lok (model GS-412); Konig & Meyer (model 175, 175/1, 176/1, 17660); Monteleone Instruments (The Grand Stand); Hamilton Stands Incorporated (model KB31).

As to each of these problems of securing and locking the position of articulated members and for providing support of instruments and other devices, the present invention discloses technology which overcomes every one of the problems disclosed in a practical fashion.

SUMMARY OF INVENTION

Accordingly, the broad goal of the invention is to provide an instrument support system having articulated members which may be positively locked in an operation position and which may be unobtrusively folded away to a positively locked storage position. The positive locking features disclosed are varied and may be incorporated into a variety of components and used in numerous applications. Naturally, as a result of these several different and potentially independent aspects of the invention, the objects of the invention are quite varied.

One of the broad objects of the invention is to prevent discrete forces having multiple vectors which are inherent to the instrument support system, such as the weight of the instrument support on the end of a pivot member, or operational forces, such as those generated during the support of instruments and other devices, from being translated through the articulated members of the instrument support system into a force having substantially the same vector. By directing the forces in different or opposing directions the cumulative force in the instrument support system is not focused on a particular surface or component of the instrument support system. Maintaining multiple vector forces in the instrument support system distributes the force over more surface area which deflects individual components less, allows the components to move more smoothly in relation to one another, and subjects the components to less wear and tear.

A related object is to spread the inherent and operational forces transmitted to surfaces which engage the articulated members over multiple surfaces or larger surface areas. By spreading the forces over more surfaces or larger areas, the force per unit area is reduced on the various components which may result in extended component life and may allow the use of less costly and lighter weight materials in the construction of the instrument support system.

Another object of the invention is to positively lock the articulated members once they have traveled to and are secured at a desired location. Positive locking of the articulated members substantially prevents any travel of the articulated member from the desired position in any direction. One important aspect of the invention is to provide positive locking that is not dependent on the spatial orientation of the instrument support system. The locking mechanism should not fail even though the instrument support system is rotated from the vertical position or even when the instrument support system is used in an inverted position.

A related object is to integrate into the instrument support system an unobtrusive storage position for each articulated member. As with the operational position of the articulated members, the storage position may also incorporate a positive locking mechanism for each of the articulated members.

Another object of the invention is to provide a safety enclosure which surrounds the force transmitting surfaces of the articulated members and the force receiving surfaces of the locking mechanisms such that the user or other items may not be caught between the surfaces when they engage one another.

Yet another object of the invention is to provide an uncomplicated technique and device for positively locking the travel of articulated members. One aspect of this object is engineering the instrument support stand to have the fewest functional components. Another aspect of this object is to subsequently combine separate components into unitary constructs.

A related object of the invention is to provide ease of use by incorporating into the instrument support system a locking mechanism with certain visual indicators, auditory or tactile cues which indicate to the user when the articulated member locking mechanisms are in the locked or unlocked position.

Yet another related object of providing ease of use is to incorporate self-actuating lock position restraining elements which prevents the locking mechanism from inadvertently being disturbed from the lock position once the positive lock is established.

Still another object of the invent of the invention is to provide articulated members which may be interchanged so as to provide an instrument system which may serve multiple purposes. With regard to this aspect, the articulated members, once incorporated into the instrument support, must then function without the user having a concern that the articulated couplings may come apart during operation or just as importantly during a period of storage.

Another broad object of the invention is to provide a support member having a self locating operation position and having a storage position with a positive locking feature.

Another broad object of the invention is to provide an instrument restraining collar having an operation and storage position with positive locking detents. Another aspect of providing an instrument restraining collar is to furnish a restraining collar closure to secure instruments, equipment and otherwise within the restraining collar. Yet another aspect of the invention is to configure the restraining collar to provide a instrument peripherals holder. The instrument peripherals holder may conveniently hold or store small, easily misplaced items such as cords, strings, or guitar picks to name a few.

Naturally further objects of the invention are disclosed throughout other areas of the specification and claims.

DETAILED DESCRIPTION OF THE PREFERRED EMBODIMENTS

The invention constitutes a collapsible instrument support system which may be used to position a variety of instruments or devices as described. As can be easily understood, the basic concepts of the present invention may be embodied in a variety of ways. The invention involves both methods as well as apparatuses to accomplish the appropriate methods. In this application, the methods are disclosed as part of the results shown to be achieved by the various apparatuses described and as steps which are inherent to utilization. They are simply the natural result of utilizing the devices as intended and described. In addition, while some particular embodiments of the invention are disclosed to accomplish certain methods described, it would be understood that these can be varied in a number of ways. Importantly, as to all of the foregoing, all of these facets should be understood to be encompassed by this disclosure.

Figure 1:
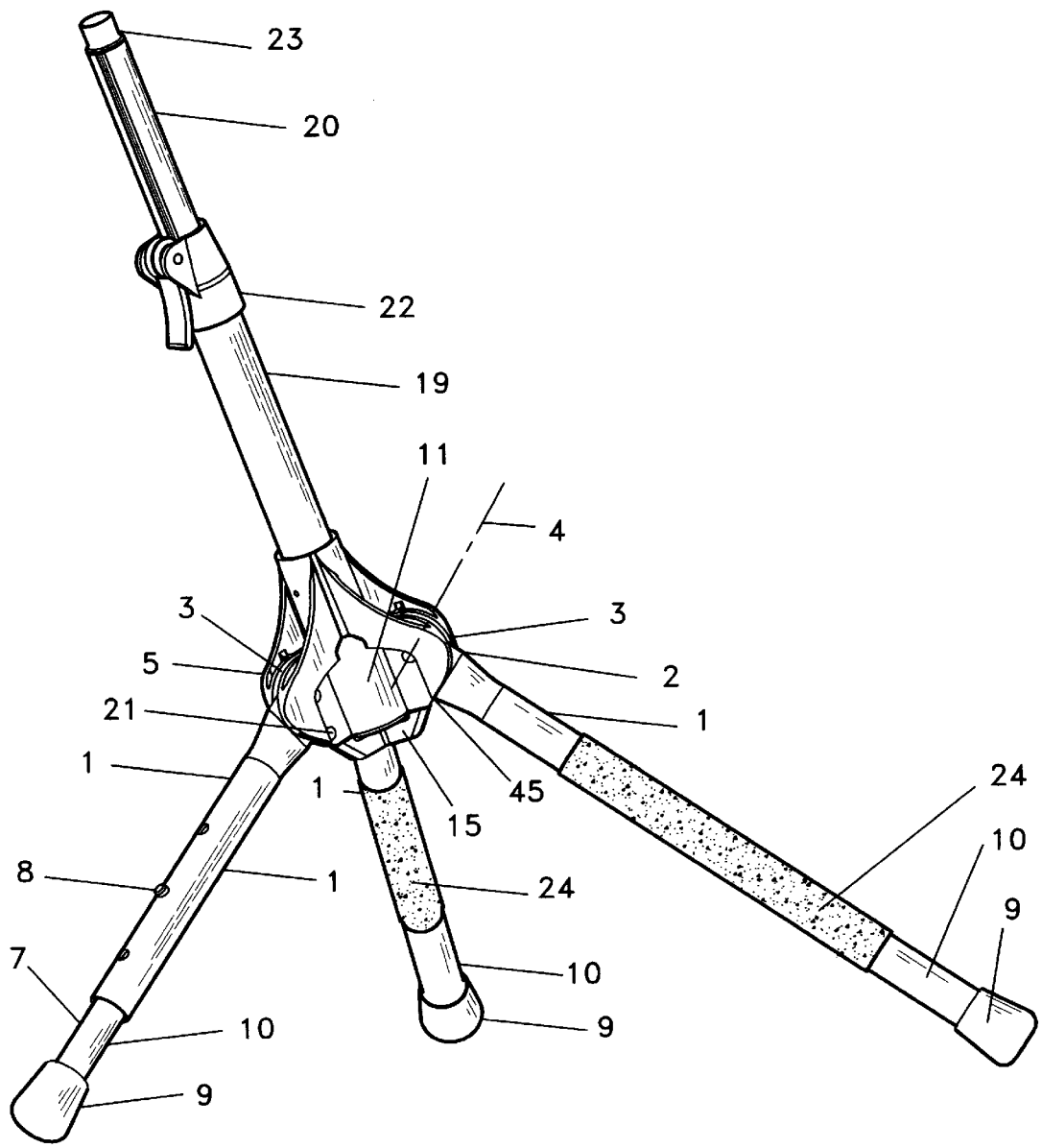
FIG. 1 is a drawing showing a particular embodiment of the invention in an operation position.
Figure 2:
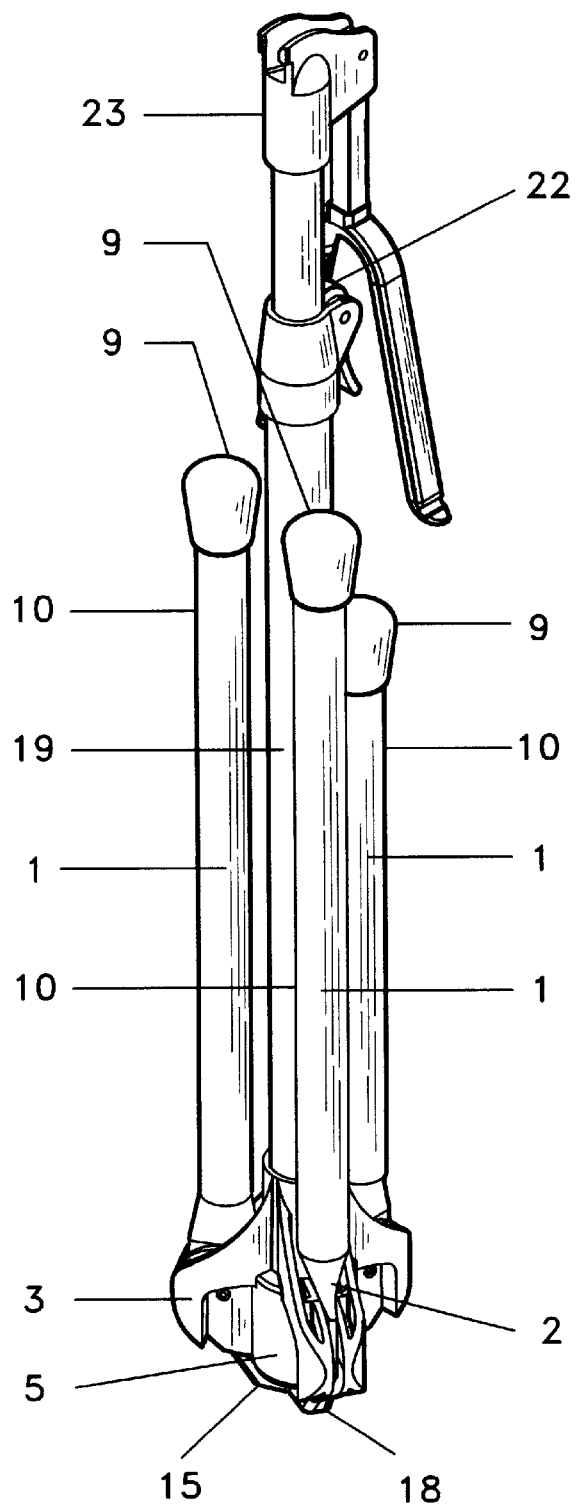
FIG. 2 is a drawing showing a particular embodiment of the invention in a storage position.
Figure 3:
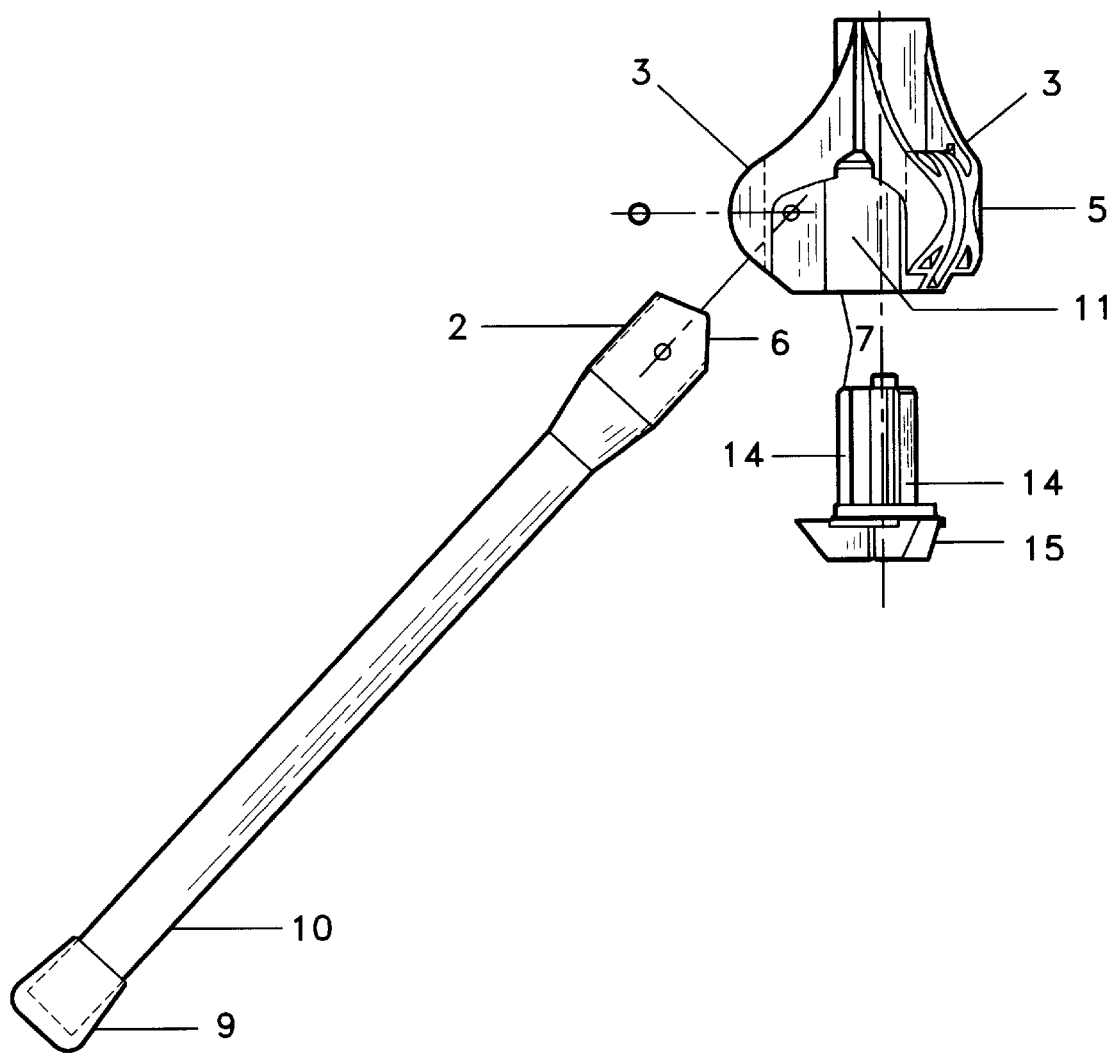
FIG. 3 is an exploded drawing showing a particular embodiment of a collapse element.
Figure 4:
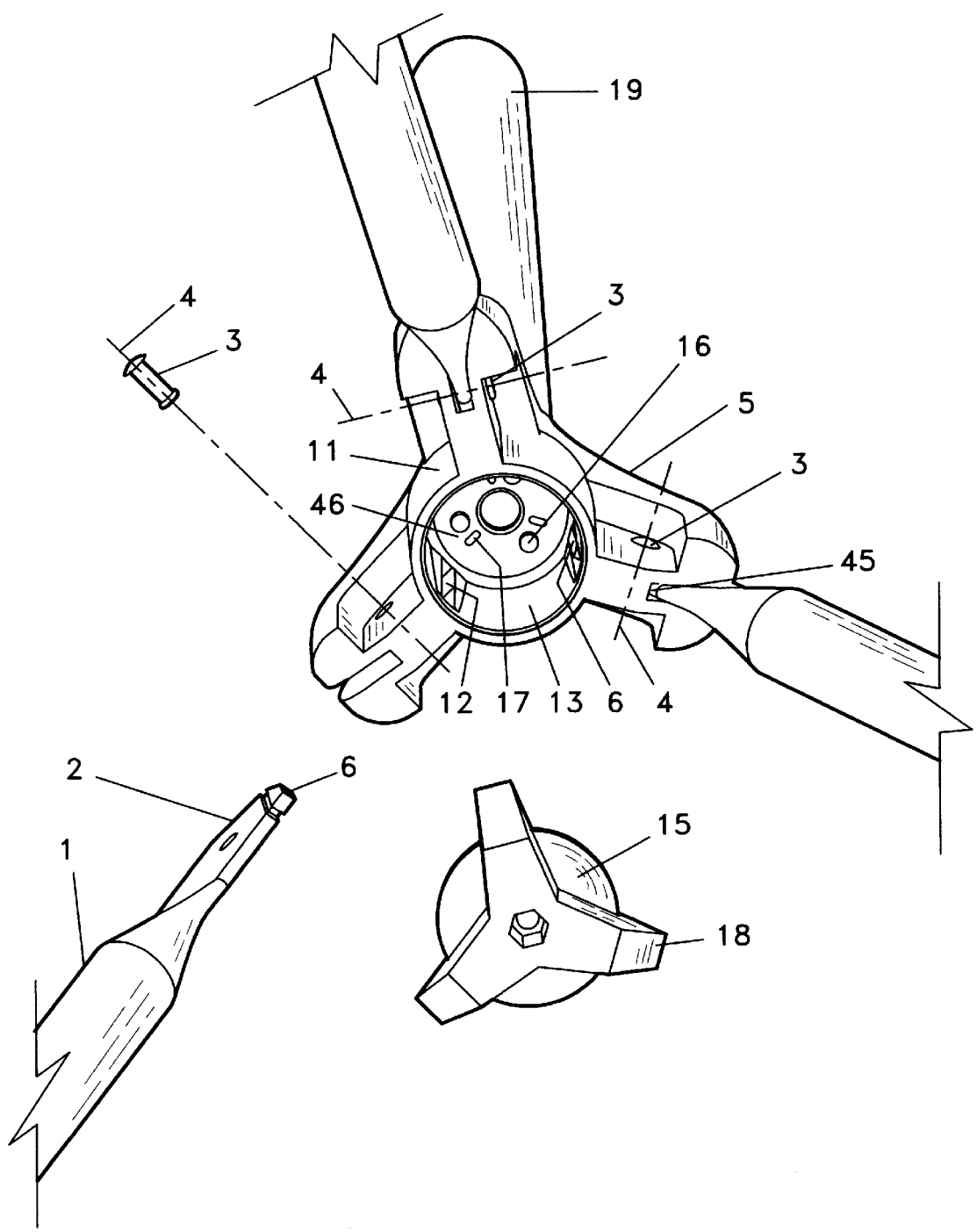
FIG. 4 is an exploded drawing of a particular embodiment of the invention showing the under side of a collapse element.
Figure 5:
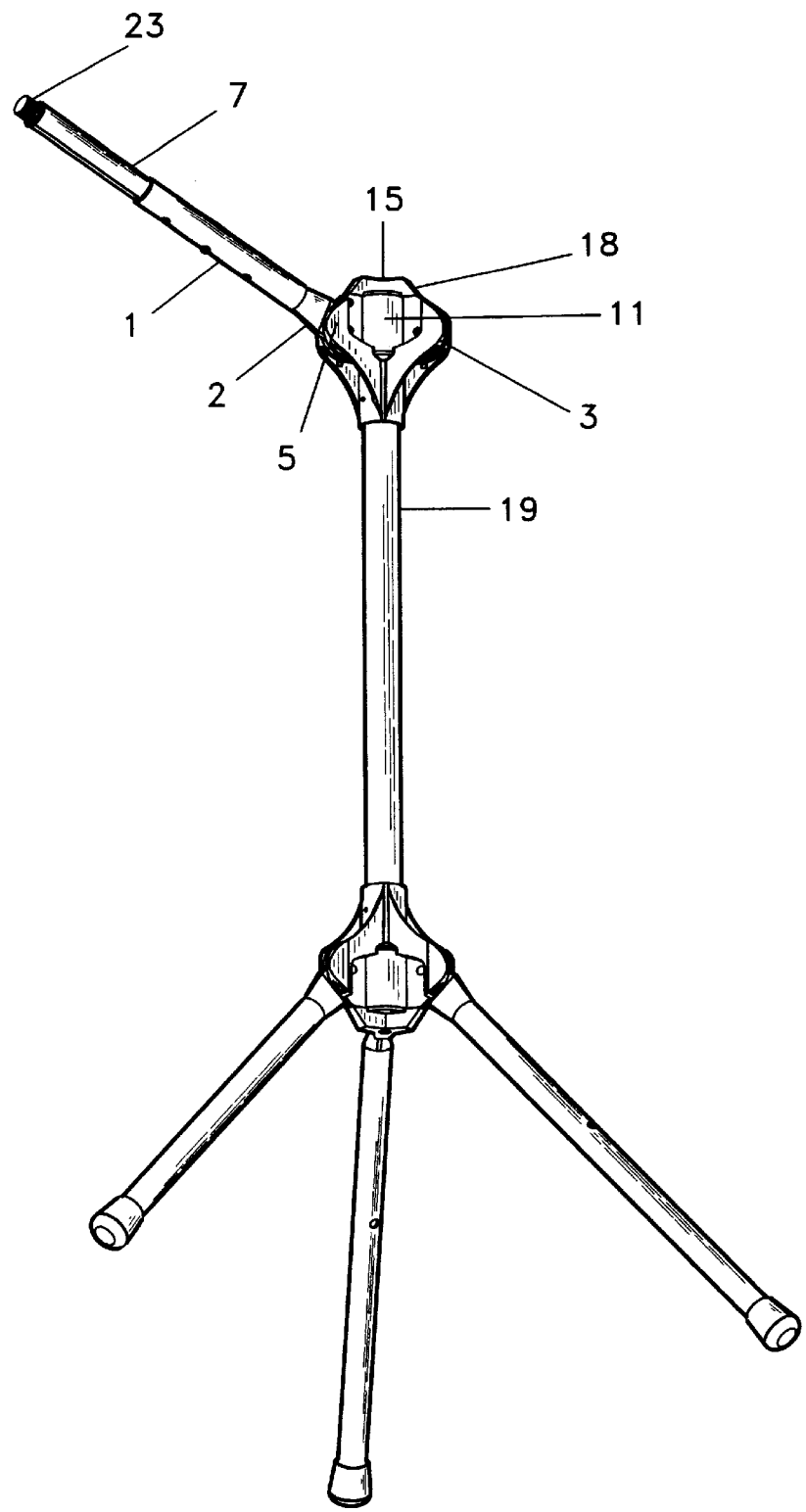
FIG. 5 is a drawing of another embodiment of the invention showing a collapse element used in the inverted position.

An embodiment of the instrument support invention is shown in FIG. 1. In that embodiment at least three pivot members (1) are rotatably coupled by a first pivot member end (2) to at least three pivot elements (3) each having a pivot axis (4). The first pivot member ends (2) may be blade shaped as shown in FIGS. 3 and 4 but may also have other configurations depending on the size of the instrument support system, the weight to be supported by the pivot members, and other factors. The pivot elements (3), as shown in FIG. 1, are equidistantly spaced about an exterior surface (11) to which they are coupled as part of a collapse element (5). The first pivot member ends may then be rotatably coupled to the pivot elements. Coupling the pivot members to the pivot elements allows each pivot member to be rotated about the pivot axes (4) from an operation position as shown in FIG. 1 to a storage position as shown in FIG. 2. The travel of each pivot member may be limited by engagement with a pivot member rotation termination element (21). The pivot rotation termination element (21) may be integral to the collapse element (5) or may be an independent component having several interchangeable locations with respect to the collapse element so as to allow variable limits of travel for each pivot member. Pivot rotation termination elements may be placed so as to limit the rotational travel of the pivot member in both directions of rotation. The at least three pivot members may be of equal length or may be of unequal length as shown in FIGS. 1 and 2. In some embodiments of the invention, one or more pivot members may have a telescopic member (7) by adjustment of which the length of the pivot member (1) may be selected. The telescopic member (7) may be fixed at a particular length by a securement device (8), such as the bullet catch shown in FIG. 1. An impact damage prevention element (24) may be fitted to one or more pivot members to protect instruments and other devices from being abraded or otherwise damaged upon contact with the pivot members. The impact damage prevention element (24) may be made from foam or elastomeric materials but could also encompass a variety of other materials as well. The surface of the impact damage prevention element may also comprise a friction augmentation surface to assist in preventing the instrument or other device from sliding on the impact damage prevention surface. A leg end cap (9) may be friction fitted to each second pivot member end (10). Each of the at least three pivot members (1) may have a force transmission surface (6) responsive to the second pivot member end (2). The force transmission surfaces (6) may be integral to each pivot member as shown in FIG. 3, or may be coupled to the first pivot member ends as a detachable component which may be removed and replaced as shown in FIG. 4. Each pivot element (3) is aligned with a longitudinal by-pass slot (12) which communicates with an exterior surface (11) and an interior surface (13) of the collapse element (5). As each pivot member (1) rotates about a respective pivot axis (4), the first pivot member end (2) and the associated force transmission surface (6) rotate through the longitudinal by-pass slot (12), as shown in FIG. 4. The pivot members may thereby be rotated to an instrument support operation position, as show in FIG. 1, or an instrument support system storage position, as shown in FIG. 2. At least three radially opposed force receiving surfaces (14) are rotatably engaged to the interior cylindrical surface (13). The radially opposed force receiving surfaces (14) may be rotated to align with the longitudinal by-pass slots (12). This may be accomplished by rotating a position selector (15) responsive to the at least three radially opposed force receiving surfaces (14). By rotating the radially opposed force receiving surfaces (14) so as to align with the longitudinal by-pass slots (12), the at least three force transmission surfaces (6) engage the at least three radially opposed force receiving surfaces providing at least one pivot member rotation lock position. The pivot member rotation lock position may positively secure the at least three pivot members (1) in the instrument support operation position or in the instrument support storage position. By rotating the radially opposed force receiving surfaces (14) in the opposite direction with the position selector (15), such that the radial opposed force receiving surfaces are not in alignment with the longitudinal by-pass slots (12), the force transmission surfaces may pass through the longitudinal by-pass slots. Selecting the pivot member rotation unlock position allows each pivot member (1) to freely rotate between the instrument support operation position and the instrument support storage position independent of the position of any other pivot member. For example, a single pivot member may be locked in the storage position while the other pivot members are locked in the operation position. Conversely, a single pivot member may be locked in the operation position while the others are locked in the storage position. In another embodiment of the invention, multiple sets of at least three force receiving surfaces may allow the pivot members to be secured in alternate intermediate positions between the operation position or the storage position. The invention may also incorporate a pair of lock-unlock position locator stops (16) which may project from a cylinder end cap (46). The lock-unlock position locator stops (16) limit the rotational travel of the radially opposed force receiving surfaces (14) between the pivot member rotation lock position and the pivot member rotation unlock position. Limiting the rotational travel of the radially opposed force receiving surfaces provides assurance to the user that the radially opposed force receiving surfaces (14) have traveled to the proper location so as to either properly engage the force transmission surfaces or properly disengage the force transmission surfaces (6). The invention may also incorporate a self-actuating lock position restraining element (17). The self-actuating lock position restraining element (17) may be comprised of a projected surface responsive to one or more radially opposed force receiving surfaces. The self-actuating lock position restraining element may project from the cylinder end cap (46), as shown by FIG. 4, and may be configured to couple with a mated surface located on at the top of the radially opposed force receiving surfaces (14). The self-actuating lock position restraint element (17) helps prevent the inadvertent rotation of the radially opposed force receiving surfaces (14) from the locked position during the use of the instrument support system. As an additional precaution for the user, the position selector (15) may also comprise a lock-unlock position indicator (18). The lock-unlock position indicator (18) projects from the surface of the position selector and does not align with the contour of the collapse element (5) when the radially opposed force receiving surfaces (14) are in the pivot member rotation unlock position. Visualizing the position of the lock position indicator in relation to the collapse element allows the user to determine whether the force receiving surfaces will engage the force transmission surfaces and lock the position of the pivot members. As an additional auditory cue, an audible lock-unlock signal is generated when the radially opposed force receiving surfaces (14) travel from the pivot member rotation lock position to the pivot member rotation unlock position or conversely from the unlock position to the lock position. Hearing the lock-unlock signal upon rotation of the force receiving surfaces indicates that the force receiving surfaces have been moved into or from the lock position. Moreover, a tactile lock-unlock cue allows the user to feel when the radially opposed force receiving surfaces (14) have traveled from the lock position to the unlock position or vice versa. Each of these visual indicators, auditory, or tactile cues may be used separately or in combination depending upon the size, configuration and use of the instrument support system. A mast (19) may be fixed to the collapse element (5) by a first mast end so as to support an instrument or other device at a height above the collapse element. A telescopic mast (20) may be slidably coupled to the interior surface of the second mast end allowing an instrument or other device to be positioned at a variable height above the collapse element. Upon selecting the appropriate position of the telescopic mast, the position may be fixed by a telescopic mast securement device (22) such as that shown in FIG. 1 or by a bullet catch (8) as shown in the same Figure. The mast (19) or the telescopic mast (20) may terminate in an adaptor element (23) for the attachment of a variety of instruments, articulated members, support devices, or the like. The adaptor element may be a post, as shown in FIG. 1 which slidably couples with components configured to mate with the post or may be a spiral thread for rotatable coupling with a mated spiral thread as shown by FIG. 5, or may be other fittings designed to mate with instruments or other components. In the embodiment of the invention shown in FIG. 5, an inverted second collapse element may be fixed to the first mast end. The inverted collapse element, as shown, may be designed in a similar manner to the collapse element described above whereby a pivot member or a plurality of pivot members may be locked in a operation position or a storage position by the engagement of at least one force transmission surface (6) with at least one radially opposed force receiving surface (14). A radially opposed force receiving surface (14) may be use in the inverted application because the interior cylindrical surface (13) is circumjacent to the radially opposed force receiving surfaces and it is not necessary for the radially opposed force receiving surfaces to move co-axially in order to establish the instrument support stand in the operation position or the storage position. Lock-unlock position locator stops responsive to the radially opposed force receiving surfaces, the self-actuating lock position restraining element, the lock-unlock indicator, the audible lock-unlock signal, and the tactile lock-unlock cue each function in the manner indicated above in the inverted application of the collapse element.

The method of operating the instrument support stand is exemplified by the various figures. FIG. 1 shows the instrument support stand in the operation position. FIG. 2 shows the instrument support stand in the storage position. To establish the instrument support stand in the operation position from the storage position, the user first rotates the position selector (15) to the unlock position. In doing so, the user will initially feel the self actuating lock position restraint element (17) resisting the rotation to the unlocked position. Upon rotating to the unlocked position, the user will hear an audible lock-unlock signal and receive a tactile lock-unlock indication. The position selector (15) is rotated until the radially opposed force receiving surfaces (14) reach the extent of their rotational travel by engaging the lock-unlock position locator stop (16). Visualizing the lock position indicator (18) the user may confirm that the radially opposed force receiving surfaces are no longer engaging the force transmitting surfaces. The instrument support system is now unlocked. The user may now rotate each pivot member (1) about the respective pivot axis (4) of the collapse element (5). Each pivot member is rotated to the pivot member rotation termination element (45). The position selector is then rotated in the opposite direction until the radially opposed force receiving surface reach the extent of their rotational travel by engaging the lock-unlock position locator stop (16). As the radially opposed force receiving surfaces reach the locked position, the user will hear an audible lock-unlock signal, feel the self-actuating lock position restraint element (17) engage and observe that the lock position indicator (18) is aligned with the collapse element (5). The user may then adjust the telescopic members (7) and secure them in the appropriate position by aligning the bullet catch (8) or other securement device. The pivot member end caps (9) are then placed upon the desired surface. The user may now adjust the telescopic mast (20) and secure it. To establish the instruments support system in the storage position the method is carried out in reverse order.

Figure 6:
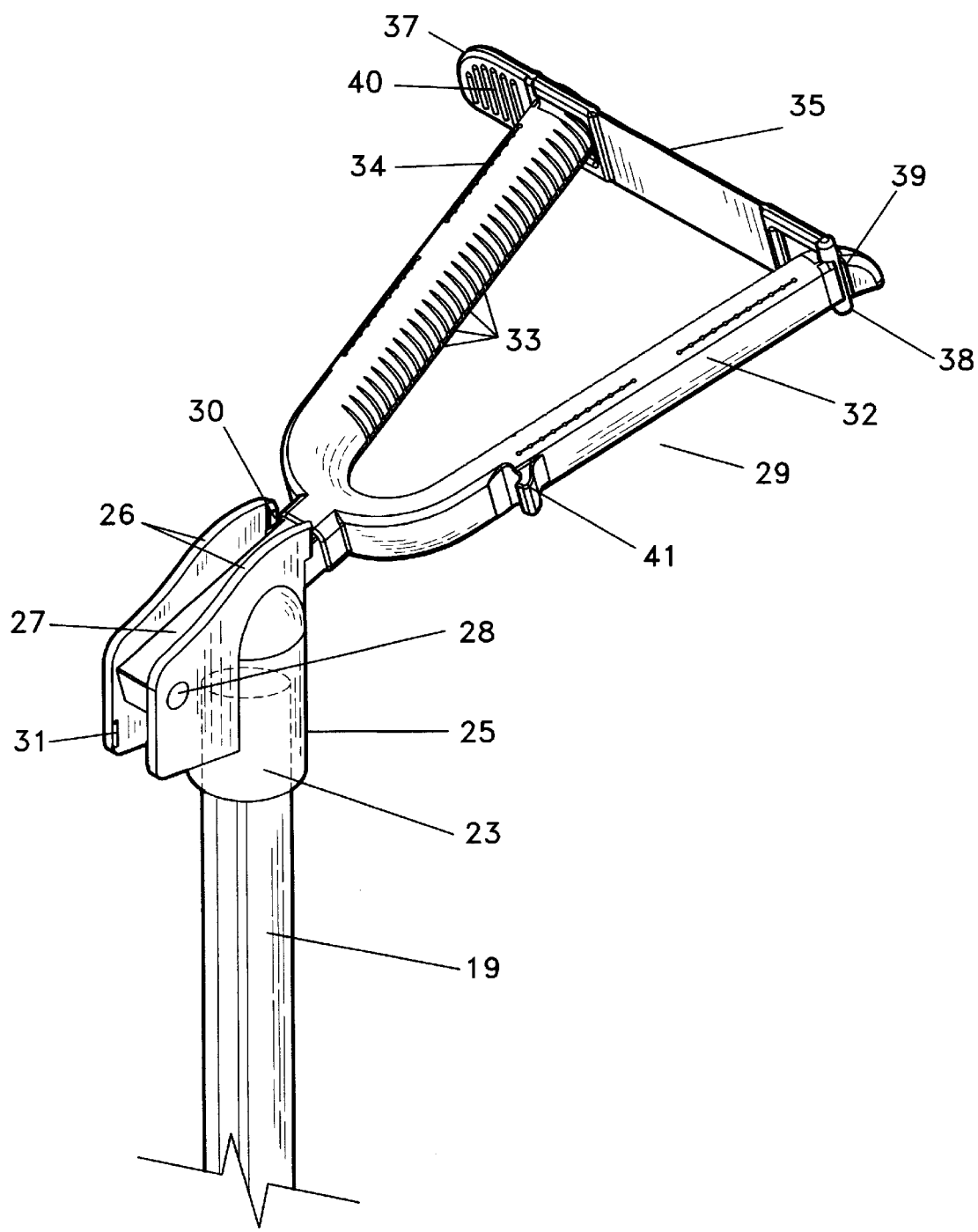
FIG. 6 is a drawing showing a restraining collar viewed from the backside.
Figure 7:
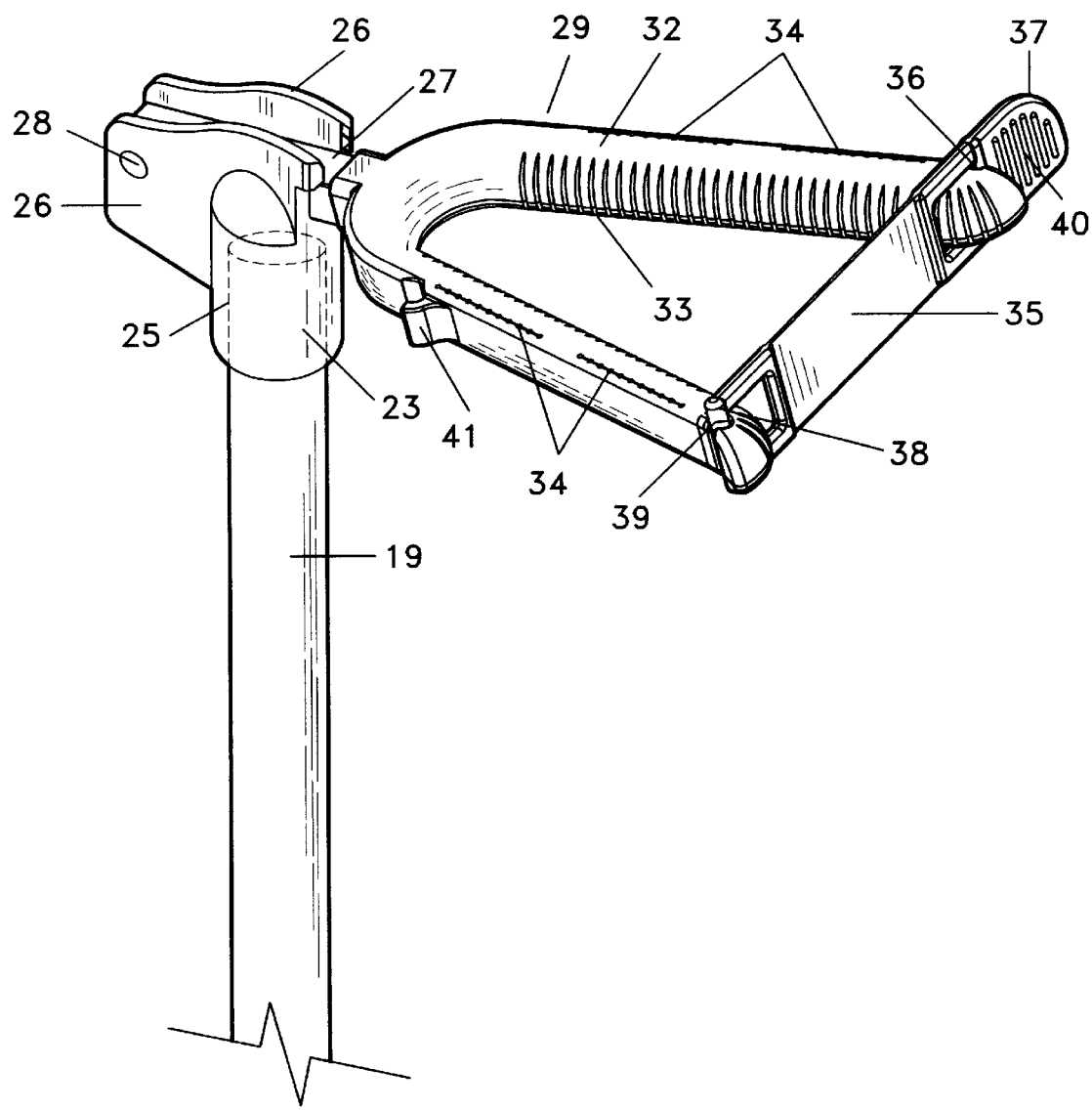
FIG. 7 is a drawing of the restraining collar in the operation position viewed from the front side.
Figure 8:
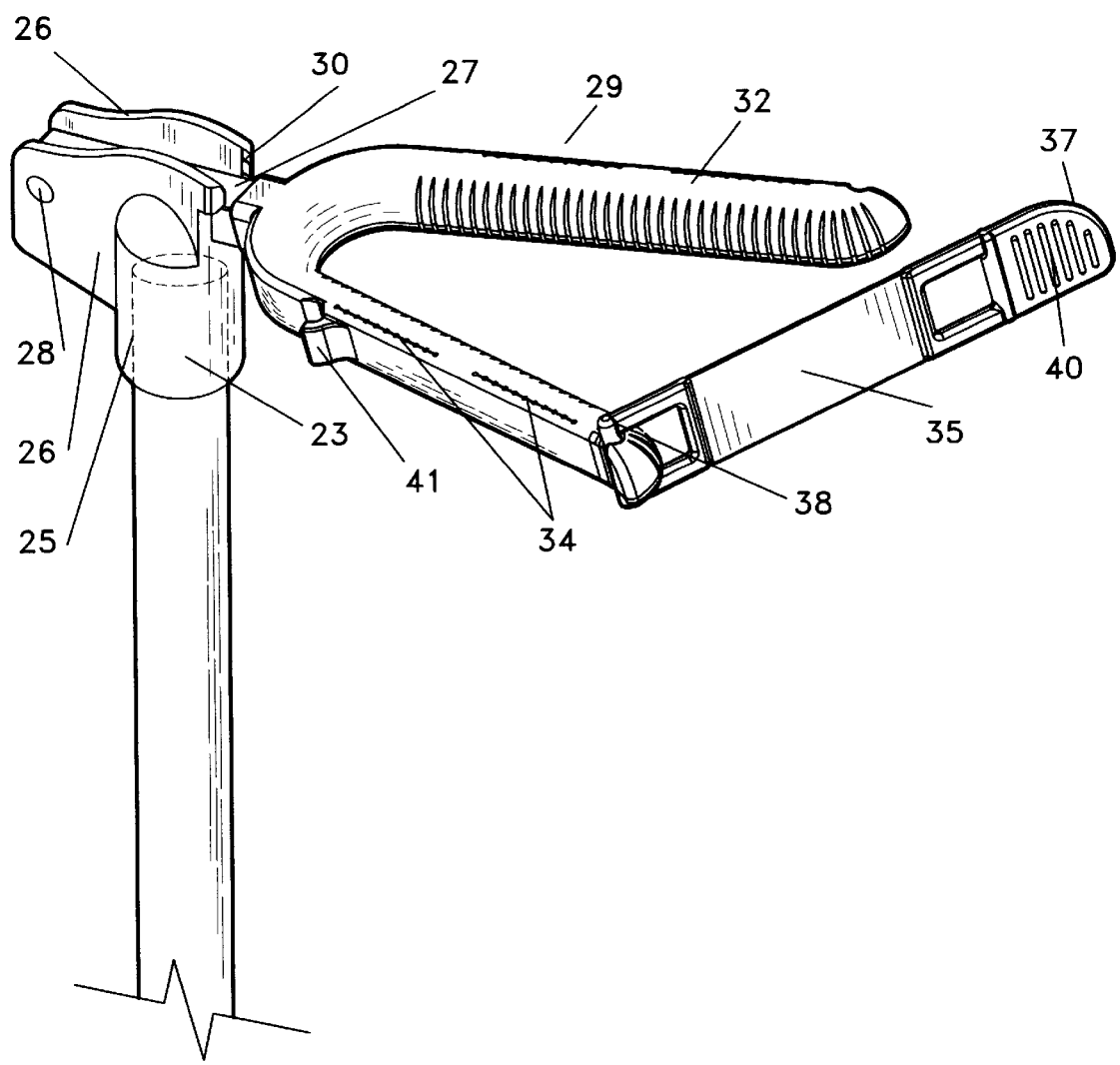
FIG. 8 is a drawing showing the restraining collar closure and the collar closure latch.
Figure 9:
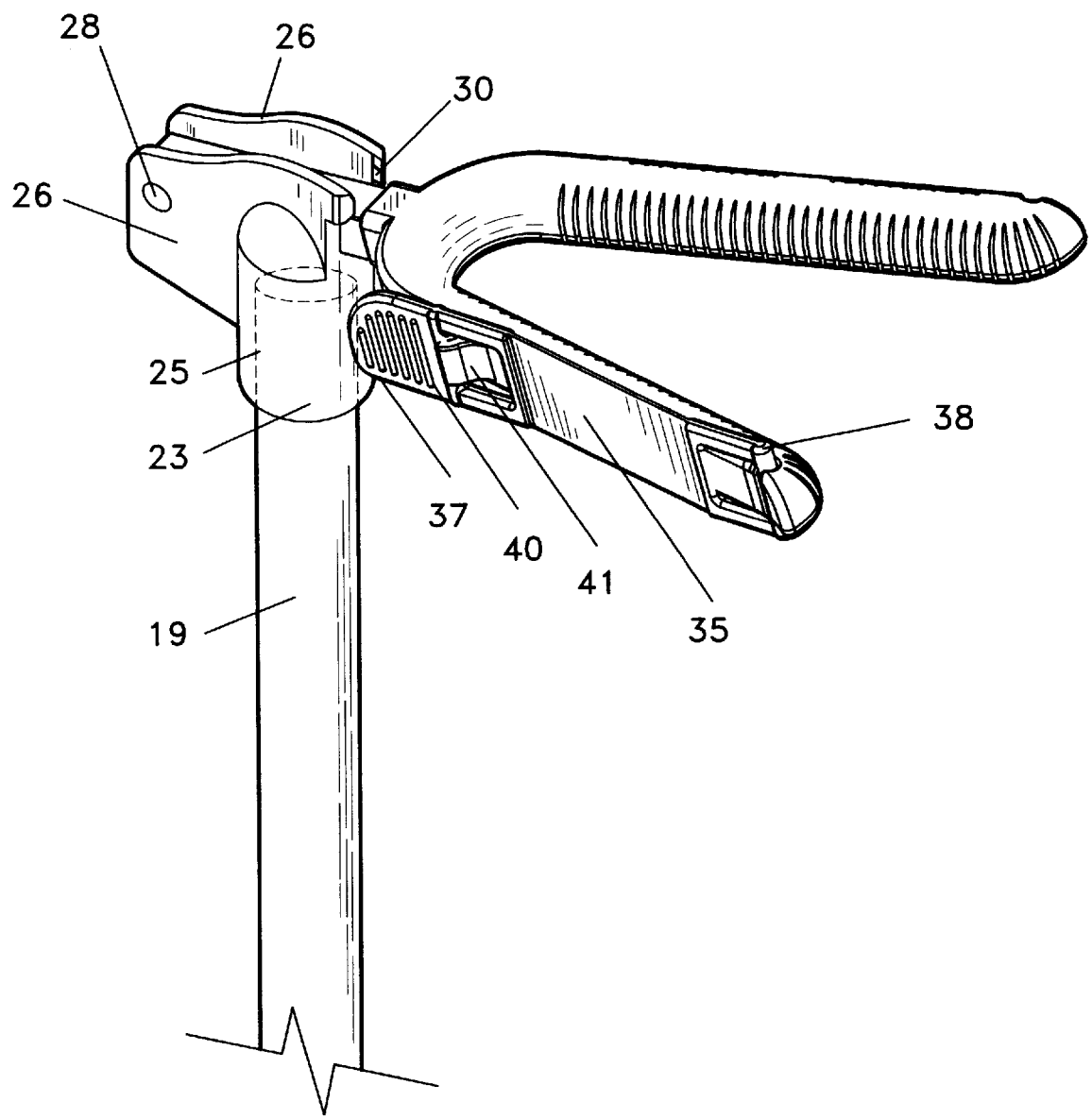
FIG. 9 is a drawing showing the restraining collar in the storage position.
Figure 10:
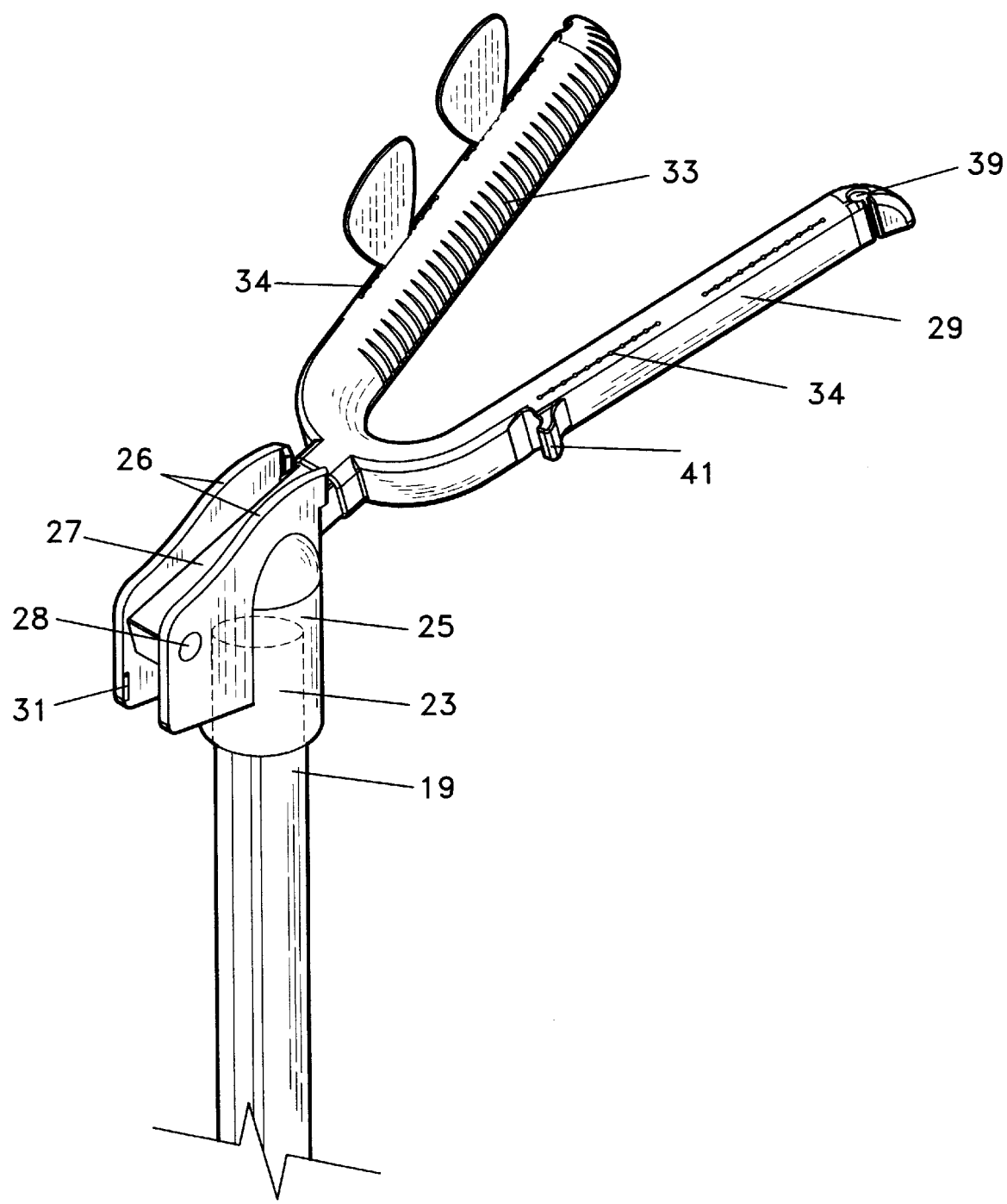
FIG. 10 is a drawing showing a particular embodiment of a instrument peripherals holder with guitar picks.

Another embodiment of the invention is shown in FIGS. 6, 7, 8, 9, and 10. The adaptor element (23) supports a restraining apparatus which is designed to support an instrument. The particular embodiment shown by the above mentioned figures may be used to hold a guitar by positioning a guitar neck within a restraint collar (29). As shown by FIG. 6, the restraining apparatus comprises a adaptor coupling element (25) which may be responsive to an adaptor element (23) by being slidably coupled, friction fit, compression fit or coupled by the use of spiral threads, or the like. At least one pivot member guide or a pair of pivot member guides (26) may project from the adaptor coupling element. The pivot member guides are configured to interface on either side of a multiple position pivot member (27). A pivot element (28) interpenetrates the pivot member guides (26) perpendicularly and provides a pivot axis about which the multiple position pivot member (27) rotates. A restraining collar (29) is fixed to the second end of the rotatable multiple position pivot member (27). As shown in FIG. 6, the restraining collar may be configured as a yoke having dimensions suitable to hold a guitar by the neck. The restraining collar may, however, may be configured differently to support a variety of instruments and devices. The restraining collar (29) travels between the operation position, as shown by FIGS. 6 and 7, to the storage position as shown by FIG. 2. An operation position locking detent (30) responsive to at least one pivot member guide (26) and the multiple position pivot member (27) secures the multiple position pivot member in the operation position against typical opposing rotational forces encountered during use. This securement helps eliminate rotation of the multiple position pivot member during removal of an instrument from the restraining collar thereby enhancing the ease with which the instrument may be removed from the restraining collar. Similarly, a storage position locking detent (31) is provided to secure the multiple position pivot member (27) in the storage position. A pliant contact surface (32) may be responsive to the restraining collar (29) to help prevent abrasion or other damage to instruments or devices while being held by the restraining collar. The pliant contact surface (32) may be an elastomeric material which surrounds the surface of the restraining collar as shown in FIGS. 6 to 10 but could be any soft or pliant material attached to at least a portion of the surface of the restraining collar. A single motion opposition projection or a pattern of motion opposition projections (33) may also be applied or molded into the pliant contact surface. The motion opposition projections (33) assist in holding the instrument in the restraining collar (29). The material from which the motion opposition projections are made, and the pattern, may vary depending on the particular instrument or device to be restrained. A instrument peripherals holder (34) may also be incorporated into the restraining collar or the pliant contact surface, and configured to hold various items, such as power cord ends and spare parts as examples. In one particular embodiment or the invention shown by FIG. 6, the instrument peripherals holder may comprise slots formed in an elastomer pliant contact surface during molding. The slots may be used to hold guitar picks as shown by FIG. 10. A collar closure (35) as shown in FIGS. 6, 7, 8, and 9, may be used to assist in holding the instrument or device within the restraining collar (29). The collar closure is releasably coupled to a restraining collar closure latch (36) in the operation position. To release the collar closure from the restraining collar the gripping extension (37) is pulled away from the collar closure latch and rotated about the collar closure pivot (38) which is rotatably coupled to a restraining collar pivot surface (39). The gripping extension may also comprise a gripping extension friction augmentation surface (40) to help prevent slipping from the users grasp. The collar closure may be rotated and releasably coupled to the storage position closure latch (41) as shown by FIG. 9. The collar closure may be made from a resiliently flexible elastomer or from a variety of other materials as well. The specific material and final configuration of the collar closure may be selected to be compatible with the size, shape and weight of the instrument or device to be held in the restraining collar.

Figure 11:
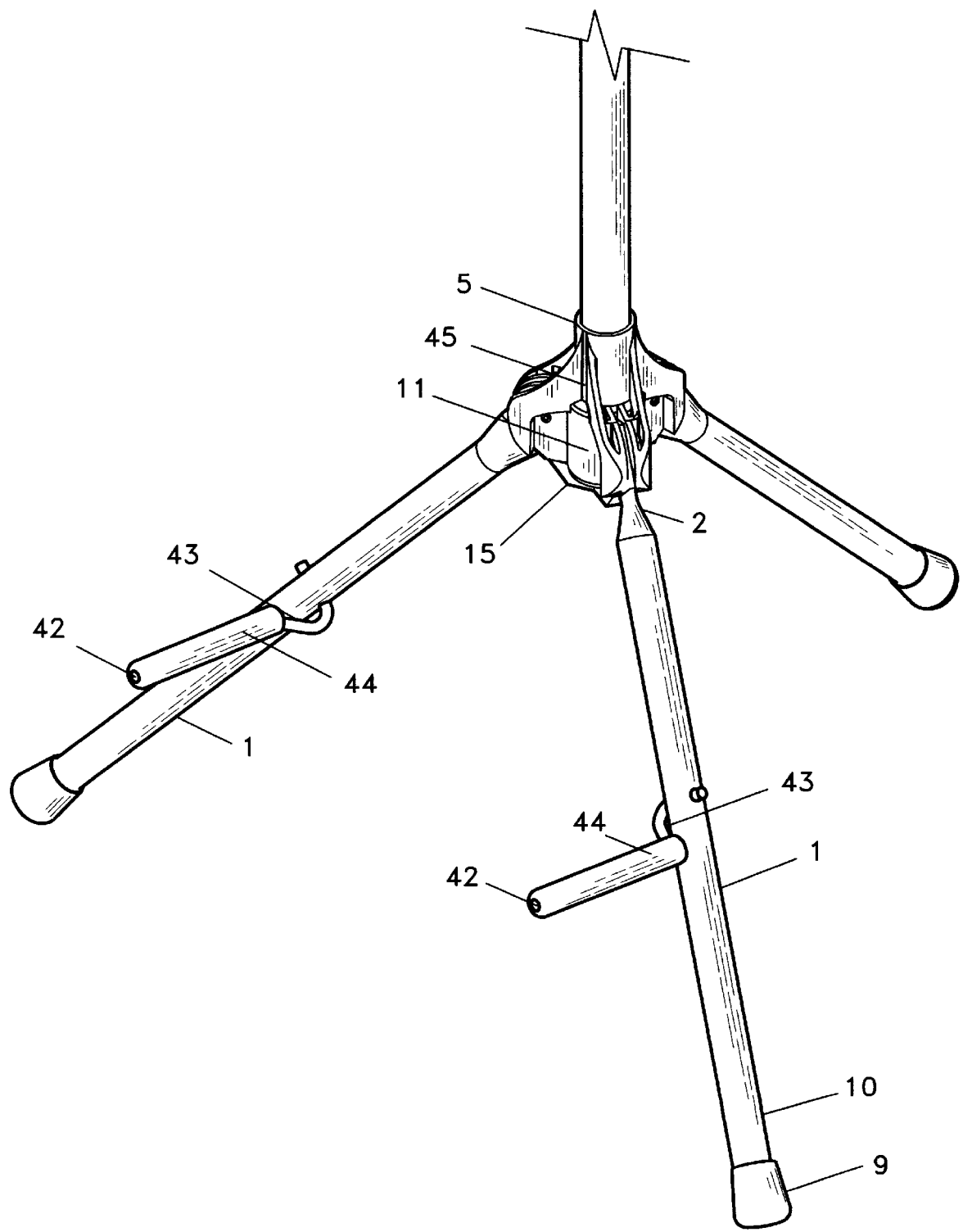
FIG. 11 is a drawing showing a particular embodiment of a pair of support members in the operation position.
Figure 12:
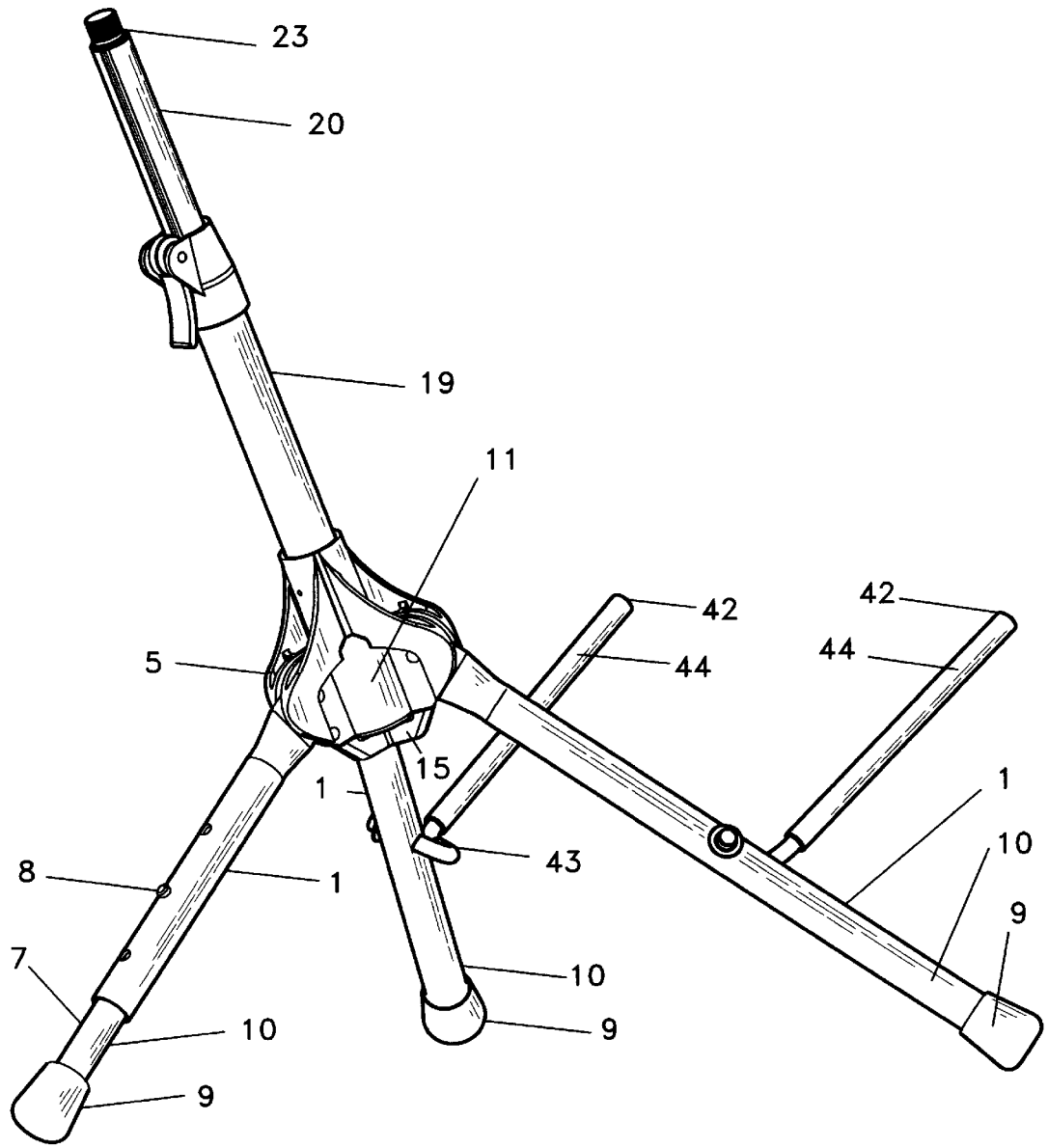
FIG. 12 is a drawing viewing the pair of support members from the back side.
Figure 13:
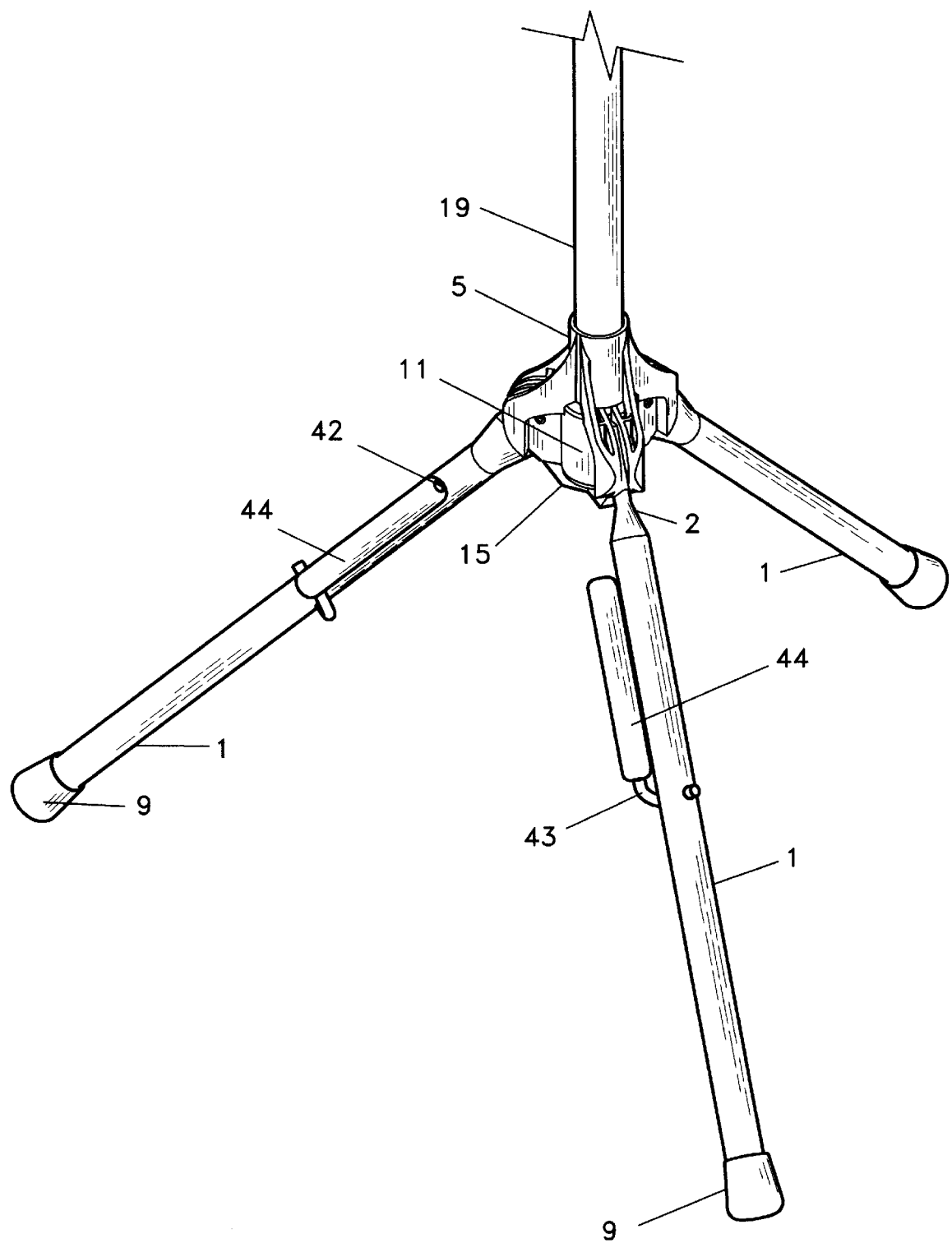
FIG. 13 is a drawing showing the pair of support members rotated adjacent to pivot members.
Figure 15:
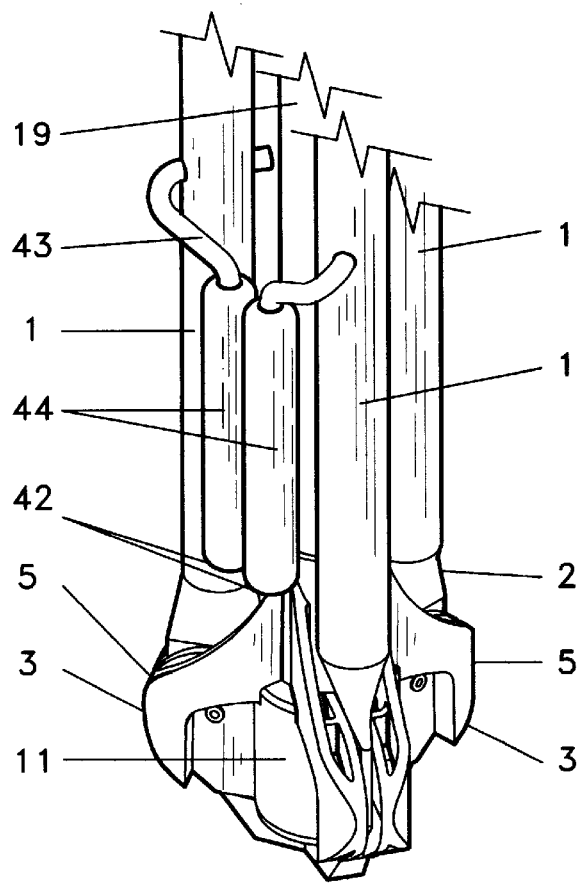
FIG. 15 is a drawing showing a front view of a particular embodiment of the support members in the storage position.
Figure 14:
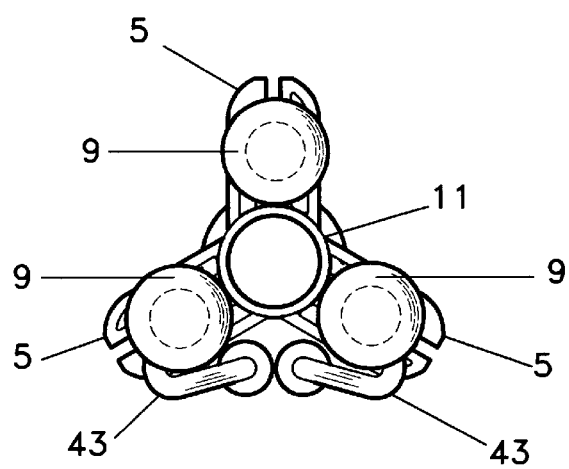
FIG. 14 is a drawing showing a top view of a particular embodiment of the support members in the storage position.

In another embodiment of the invention shown by FIGS. 11, 12, 13, 14, and 15, at least two dual position support members (42) are rotatably joined to at least two pivot members (1). Each dual position support member has a support member operation position, as shown by FIGS. 11 and 12, and a support member storage position, as shown by FIGS. 14 and 15. In the operation position the dual member support members (42) extend away from the pivot members (1) to which the support members are rotatably joined. In the operation position, a variety of instruments, equipment or other devices may be set upon the surface of a pair of dual position support members. Each dual position support member (42) may also have a self-locating surface (43) which may engage the exterior surface of the pivot member to which the support member is rotatably joined. This self-locating surface allows the support member to be rotated and releasably fixed in the proper position for operation. The user of the instrument support system (42) may position the support member from the operation position to the support member storage position by rotating the support member so that it is adjacent to the pivot member to which it is rotatably joined, as shown by FIG. 13. When the user desires to store the instrument support system the pivot members (1) are rotated to the pivot member storage position. During the rotation of the pivot members a portion of the exterior surfaces of the support members becomes juxtaposed, as shown in FIGS. 14 and 15. Juxta positioning such exterior surfaces creates an antagonism between the support members preventing the support members (42) from unfolding from the support member storage position until the pivot members (1) are returned to the operation position. These antagonist locking surfaces may function with an abrasion prevention surface (44) coupled to all or part of the exterior surface of the dual position support member (42). The abrasion prevention surface may be made from elastomeric or foam material as but two examples. The collapse element may also incorporate a support member storage surface (45) which is configured so as to at least partially encompass the antagonist locking surfaces when juxtaposed.

It is thought that the apparatuses and methods of the embodiments of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, and as but one example the disclosure of a "pivot member" should be understood to encompass disclosure of the act of "pivoting the member"—whether explicitly discussed or not-and, conversely, were there only disclosure of the act of "pivoting the member", such a disclosure should be understood to encompass disclosure of a "pivot member". Such changes and alternative terms are to be understood to be explicitly included in the description.

Any references mentioned, including but not limited to the references in the application to patents, publications, brochures, marketing materials, or the like, are hereby incorporated by reference or should be considered as additional text or as an additional exhibits or attachments to this application to the extent permitted; however, to the extent statements might be considered inconsistent with the patenting of this/these invention(s) such statements are expressly not to be considered as made by the applicant.

Further, the disclosure should be understood to include support for each feature, component, and step shown as separate and independent inventions as well as the various combinations and permutations of each.

We claim:

1. An instrument support, comprising:
   a. a mast having a first mast end and a second mast end;
   b. a collapse element fixed to said second mast end of said mast further comprising:
      i. an exterior surface;
      ii. an interior cylindrical surface;
      iii. at least three by-pass slots which communicate with said exterior surface and with said interior cylindrical surface; and
      iv. at least three pivot elements coupled to said exterior surface wherein said at least three pivot elements align with said at least three by-pass slots;
   c. at least three pivot members each having a first pivot member end and a second pivot member end wherein said first pivot member ends are rotatably coupled to said at least three pivot elements;
   d. at least three force transmission surfaces responsive to said first pivot member ends;
   e. at least three radially opposed force receiving surfaces rotatably engaged to said interior cylindrical surface of said collapse element, wherein forces transmitted from said force transmission surfaces to said radially opposed force receiving surfaces are directed substantially perpendicular to the rotation axis of said radially opposed force receiving surfaces when said pivot members are in the operational position; and
   f. a position selector coupled to said at least three radially opposed force receiving surfaces.

2. The instrument support as described in claim 1, further comprising a lock position wherein said at least three radially opposed force receiving surfaces are aligned with said by-pass slots.

3. The instrument support as described in claim 1, further comprising an unlock position wherein said at least three radially opposed force receiving surfaces are not aligned with said by-pass slots.

4. The instrument support as described in claim 1, further comprising at least one pivot member rotation termination element coupled to at least one of said at least three pivot elements.

5. The instrument support as described in claim 2, wherein said locked position comprises a locked operation position wherein said at least three pivot members have a substantially fixed position radial to said mast.

6. The instrument support as described in claim 2, wherein said locked position comprises a locked storage position wherein said at least three pivot members have a substantially fixed position adjacent to said mast.

7. The instrument support as described in claim 5, wherein said locked operation position comprises having at least one of said at least three pivot members rotatably fixed substantially adjacent to said mast and wherein the remaining of said at least three pivot members have a substantially fixed position radial to said mast.

8. The instrument support as described in claim 5, wherein said locked operation position comprises having at least one of said at least three pivot members substantially fixed radial to said mast and wherein the remaining of said at least three pivot members substantially fixed adjacent to said mast.

9. The instrument support as described in claim 1, further comprising a pair of lock-unlock position locator stops responsive to at least one of said at least three radially opposed force receiving surfaces and wherein said at least three radially opposed force receiving surfaces have a limit of travel between said lock and unlock positions.

10. The instrument support as described in claim 9, further comprising a self-actuating lock position restraining element responsive to at least one of said at least three radially opposed force receiving surfaces in said lock position.

11. The instrument support as described in claim 1, wherein said position selector further comprises a lock-unlock position indicator.

12. The instrument support as described in claim 10, further comprising an audible lock-unlock signal activated by rotation of at least one of said at least three radially opposed force receiving surfaces traveling between said lock and unlock positions.

13. The instrument support as described in claim 12, further comprising a tactile lock-unlock cue activated by rotation of at least one of said at least three radially opposed force receiving surfaces traveling between said lock and unlock positions.

14. The instrument support as described in claim 1, further comprising an adaptor element joined to said first mast end.

15. The instrument support as described in claim 1, further comprising a telescopic member slidably engaged to an interior surface of said mast.

16. The instrument support as described in claim 1, further comprising an impact damage prevention element responsive to at least a portion of at least one of said at least three pivot members.

17. The instrument support as described in claim 16, further comprising a friction augmentation surface joined to said impact damage prevention element.

18. The instrument support as described in claim 1, further comprising at least two dual position support members rotatably joined to at least two of said at least three pivot members.

19. The instrument support as described in claim 18, wherein said at least two dual position support members has a support member operation position.

20. The instrument support as described in claim 18, wherein said at least two dual position support members has a support member storage position.

21. The instrument support as described in claim 18, further comprising an operation position self locating surface coupled to each of said at least two dual position support members.

22. The instrument support as described in claim 18, further comprising an abrasion prevention surface responsive to at least a portion of each of said at least two dual position support members.

23. The instrument support as described in claim 18, further comprising an antagonist locking surface responsive to each of said at least two dual position support members wherein said antagonist locking surfaces juxtapose when said at least two of said at least three pivot members and each of said at least two dual position support members are in said storage positions.

24. The instrument support as described in claim 15, further comprising an adaptor element joined to said telescopic member.

25. The instrument support as described in any one of claims 14 or 24, further comprising:
   a. an adaptor coupling element;
   b. at least one pivot member guide projecting from said adaptor coupling element;
   c. a pivot element which interpenetrates said at least one pivot member guide perpendicularly;
   d. a multiple position pivot member having a first end rotatably coupled to said pivot element and a second end; and
   e. a restraining collar fixed to said second end of said multiple position pivot member.

26. The instrument support as described in claim 25, further comprising an operation position locking detent responsive to said adaptor coupling element and said multiple position pivot member.

27. The instrument support as described in claim 26, further comprising a storage position locking detent responsive to said adaptor coupling element and said multiple position pivot member.

28. The instrument support as described in claim 27, further comprising a pliant contact surface responsive to at least a portion of said restraining collar.

29. The instrument support as described in claim 28, further comprising at least one motion opposition projection coupled to said pliant contact surface.

30. The instrument support as described in claim 25, further comprising an instrument peripherals holder responsive to said restraining collar.

31. The instrument support as described in claim 30, wherein said instrument peripherals holder is configured to hold guitar picks.

32. The instrument support as described in claim 25, further comprising a collar closure releasably coupled to said restraining collar.

33. The instrument support as described in claim 32, further comprising a collar closure latch responsive to said restraining collar and releasably responsive to said collar closure.

34. The instrument support as described in claim 33, further comprising a collar closure storage latch responsive to said restraining collar and releasably responsive to said collar closure latch.

35. The instrument support as described in claim 32, further comprising a gripper extension coupled to said collar closure.

36. The instrument support as described in claim 3, further comprising a gripper extension friction augmentation surface responsive to at least a portion of said gripper extension.

37. The instrument support as described in claim 1, further comprising:
   a. a second collapse element fixed to said first mast end of said mast comprising:
      i. an exterior surface;
      ii. an interior cylindrical surface;
      iii. at least one by-pass slot which communicates with said exterior surface and with said interior cylindrical surface; and
      iv. at least one pivot element coupled to said exterior surface wherein said at least one pivot element aligns with said at least one by-pass slot;
   b. at least one pivot member rotatably coupled to said at least one pivot element having a first pivot member end;
   c. at least one force transmission surface responsive to said first pivot member end;
   d. at least one radially opposed force receiving surfaces rotatably engaged to said interior cylindrical surface of said collapse element; and
   e. a position selector coupled to said at least one radially opposed force receiving surface.

38. The instrument support as described in claim 37, further comprising an adaptor element joined to said at least one pivot member of said second collapse element.

39. A method to support an instrument, which comprises the steps of:
   a. providing a mast with a first mast end and a second mast end;
   b. fixing a collapse element having an exterior surface and an interior cylindrical surface which communicate through at least three by-pass slots to said second end of said mast;
   c. aligning a pivot element having a pivot axis with each of said by-pass slots;
   d. coupling a pivot member having a first pivot member end and a second pivot member end to each said pivot element by said first pivot member end;
   e. providing a force transmission surface at each said first pivot member end; and
   f. engaging at least three radially opposed force receiving surfaces having a rotation axis with said interior cylindrical surface of said collapse element, wherein forces transmitted from each said force transmission surface to said radially opposed force receiving surfaces are directed substantially perpendicular to said rotation axis of said radially opposed force receiving surfaces when said pivot member is in the operational position.

40. The method to support an instrument as described in claim 39, which further comprises the step of adjusting a telescopic member slidably engaged to an interior surface of said mast.

41. The method to support an instrument as described in claim 40, which further comprises the step of coupling an adaptor to said telescopic member slidably engaged to said interior surface of said mast.

42. The method to support an instrument as described in claim 39, which further comprises the step of coupling an adaptor to said first end of said mast.

43. The method to support an instrument as described in any of claim 42 or 41, which further comprises the steps of:
   a. fixing an adaptor coupling element to said adaptor element;
   b. coupling at least one pivot member guide to said adaptor coupling element;
   c. interpenetrating said at least one pivot member guide with a pivot element;
   d. rotating a multiple position pivot member having a first end and a second end adjacent to said at least one pivot member guide wherein said first end of said multiple position pivot member is rotatably coupled to said pivot element;
   e. fixing a restraining collar to said second end of said multiple position pivot member; and
   f. selecting a position of said restraining collar.

44. The method to support an instrument as described in claim 43, which further comprises the step of locking said restraining collar in an operation position.

45. The method to support an instrument as described in claim 43, which further comprises the step of locking said restraining collar in a storage position.

46. The method to support an instrument as described in claim 43, which further comprises the step of providing a pliant contact surface coupled to said restraining collar.

47. The method to support an instrument as described in claim 43, which further comprises the step of coupling instrument peripherals to an instrument peripherals holder.

48. The method to support an instrument as described in claim 47, wherein said step of coupling instrument peripherals to an instrument peripherals holder comprises coupling guitar picks.

49. The method to support an instrument as described in claim 43, which further comprises the step of providing a collar closure coupled to said restraining collar.

50. The method to support an instrument as described in claim 49, which further comprises the step of securing said collar closure in an operation position by engaging a collar closure latch.

51. The method to support an instrument as described in claim 50, which further comprises the step of securing said collar closure in a storage position by engaging a collar closure storage latch.

52. The method to support an instrument as described in claim 51, which further comprises the step of gripping said collar closure with a gripping extension coupled to said collar closure.

53. The method to support an instrument as described in claim 52, which further comprises the step of providing a gripping extension friction augmentation surface.

54. The method to support an instrument as described in claim 39, which further comprises the steps of:
   a. fixing a second collapse element to said first end of said mast, wherein said second collapse element comprises:
      i. an exterior surface;
      ii. an interior cylindrical surface;
      iii. at least one by-pass slot which communicates with said exterior surface and said interior cylindrical surface; and
      iv. at least one pivot element coupled to said exterior surface, wherein said at least one pivot element aligns with said at least one by-pass slot;
   b. coupling at least one pivot member with a first pivot member end and a second pivot member end to said at least one pivot element by said first pivot member end;
   c. coupling at least one force transmission surface to said first end of said at least one pivot members; and
   d. providing at least one radially opposed force receiving surface responsive to said interior cylindrical surface.

55. The method to support an instrument as described in claim 54, further comprising the step of selecting a position of said at least one radially opposed force receiving surfaces from a group of positions consisting of a lock position wherein said at least one radially opposed force receiving surface is aligned with said at least one by-pass slot or an unlock position wherein said at least one radially opposed force receiving surface is not aligned with said at least one by-pass slot.

56. The method to support an instrument as described in claim 55, which further comprises the step of selecting a lock position from a group consisting of a locked storage position and a locked operation position.

57. The method to support an instrument as described in claim 56, which further comprises adjusting at least one pivot member extension element.

58. The method to support an instrument as described in claim 57, which further comprises fixing the position of said at least one pivot member extension element.

59. A method to support an instrument, comprising the steps of:
   a. rotating at least three radially opposed force receiving surfaces to a first position whereby said at least three radially opposed force receiving surface are not aligned with at least three by-pass slots;
   b. pivoting at least one force transmission surface through a corresponding one of said three longitudinal by-pass slots;
   c. rotating said at least three radially opposed force receiving surfaces to a second position wherein said at least three radially opposed force receiving surfaces are aligned with said at least three by-pass slots; and
   d. engaging said at least one force transmission surface with a corresponding one of said radially opposed force receiving surfaces, wherein forces transmitted from said at least one force transmission surface to said corresponding one of said radially opposed force receiving surfaces are directed substantially perpendicular to the rotation axis of said radially opposed force receiving surface when a corresponding pivot member is in the operational position.

60. The method to support an instrument as described in claim 59, wherein said step of rotating said at least three radially opposed force receiving surfaces to a first position comprises rotating a position selector to which said at least three radially opposed force receiving surface are coupled.

61. The method to support an instrument as described in claim 59, wherein said step of rotating said at least three radially opposed force receiving surfaces to a second position comprises rotating a position selector to which said at least three radially opposed force receiving surface are coupled.

62. The method to support an instrument as described in claim 59, which further comprises tile step of limiting the rotational travel of said at least three radially opposed force receiving surfaces between a lock position and an unlock position, wherein at least one of said at least three radially opposed force receiving surfaces engages a lock-unlock position locator stop.

63. The method to support an instrument as described in claim 62, which further comprises the step of resisting rotational movement of said at least three radially opposed force receiving surfaces by engaging a self-actuating lock position restraining element.

64. The method to support an instrument as described in claim 63, which further comprises the step of determining the position of said at least three radially opposed force receiving surfaces by visualizing the position of a lock position indicator.

65. The method to support an instrument as described in claim 64, which further comprises the step of hearing an audible lock-unlock signal upon engaging said self actuating lock position restraint element.

66. The method to support an instrument as described in claim 65, which further comprises the step of hearing an audible lock-unlock signal upon disengaging said self actuating lock position restraint element.

67. The method to support an instrument as described in claim 63, which further comprises the step of feeling a tactile lock-unlock cue upon engaging said self actuating position restraint element.

68. The method to support an instrument as described in claim 67, which further comprises the step of feeling a tactile lock-unlock cue upon disengaging said self actuating position restraint element.

69. The method to support an instrument as described in claim 59, which further comprises the step of providing an impact damage prevention element on at least a portion of at least one of said at least three pivot members.

70. The method to support an instrument as described in claim 59, which further comprises the step of rotating each of at least two dual position support members which are joined to at least two of said at least three pivot members to a position selected from a group consisting of a support member storage position and a support member operation position.

71. The method to support an instrument as described in claim 70, which further comprises the step of providing operation position self-location surface coupled to each of said at least two dual position support member.

72. The method to support an instrument as described in claim 71, which further comprises the step of providing an antagonist locking surface coupled to each of said at least two dual position support members.

73. The method to support an instrument as described in claim 72, which further comprises the step of locking said at least two dual position support members in said storage position by juxtaposing said antagonist locking surfaces coupled to each of said at least two dual position support members.

74. The method to support an instrument as described in claim 73, which further comprises the step of providing an abrasion prevention surface on said at least two dual position support members.

\* \* \* \* \*